United States Patent
Malenfant et al.

(10) Patent No.: US 12,330,469 B1
(45) Date of Patent: Jun. 17, 2025

(54) VEHICLE CHASSIS SYSTEM WITH AN OFFSET TRACK BAR

(71) Applicant: Ford Global Technologies, LLC, Dearborn, MI (US)

(72) Inventors: Matthew Malenfant, Livonia, MI (US); Jared Shroyer, Madison Heights, MI (US); Shane Edward Foley, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/886,705

(22) Filed: Sep. 16, 2024

(51) Int. Cl.
*B60G 7/00* (2006.01)
*B60K 1/00* (2006.01)
*B62D 7/16* (2006.01)

(52) U.S. Cl.
CPC ............... *B60G 7/001* (2013.01); *B60K 1/00* (2013.01); *B62D 7/163* (2013.01); *B60G 2200/34* (2013.01); *B60G 2200/341* (2013.01); *B60G 2206/11* (2013.01)

(58) Field of Classification Search
CPC .............. B60G 2200/341; B60G 7/001; B60G 2206/11; B60K 1/00; B62D 7/163
See application file for complete search history.

(56) References Cited

U.S. PATENT DOCUMENTS

| | | | |
|---|---|---|---|
| 7,314,221 B1 * | 1/2008 | Everlith | B60G 17/021 280/5.509 |
| 8,172,244 B2 | 5/2012 | Winter | |
| 9,150,247 B2 | 10/2015 | Aldrich | |
| 10,792,971 B2 | 10/2020 | Grimes | |
| 2005/0236795 A1 * | 10/2005 | Schreiber | B60G 9/00 280/124.116 |
| 2006/0033298 A1 * | 2/2006 | Longworth | B60G 11/50 280/124.11 |

(Continued)

FOREIGN PATENT DOCUMENTS

| | | | | |
|---|---|---|---|---|
| DE | 102011011118 A1 * | 8/2012 | | B60G 9/003 |
| FR | 2706371 A1 * | 12/1994 | | B60G 17/005 |
| WO | WO-2019034813 A1 * | 2/2019 | | B60G 21/051 |

OTHER PUBLICATIONS

E Beam—Electric Axle Drive System, Feb. 13, 2023, Magna International Inc., https://www.magna.com/products/powertrain/electrified-powertrain-products/etelligentterrain.

*Primary Examiner* — Drew J Brown
*Assistant Examiner* — Matthew D Lee
(74) *Attorney, Agent, or Firm* — Burr & Forman LLP; Lorne Forsythe

(57) ABSTRACT

The chassis system may include a frame of the vehicle forming a base for the vehicle, an axle operably coupled to the frame, the axle having a first portion with a first diameter and a second portion with a second diameter, an electric motor operably coupled to the axle to propel the vehicle, one or more wheel assemblies operably coupled to the axle, and a track bar may be operably coupled to the axle via a first end and operably coupled to the frame via a second end. The second end may be linearly displaced from the first end along a reference line, and the track bar may include a hook portion defining an offset from the reference line, the offset extending away from the axle. The hook portion may extend around a transition between the first portion and the second portion of the axle.

20 Claims, 8 Drawing Sheets

(56) References Cited

U.S. PATENT DOCUMENTS

| | | | |
|---|---|---|---|
| 2006/0208444 A1* | 9/2006 | Johnson | B60G 9/00 280/124.111 |
| 2007/0045980 A1* | 3/2007 | Lopez | B60G 7/00 280/124.153 |
| 2009/0160152 A1* | 6/2009 | Mikels | B60B 35/12 280/124.128 |

* cited by examiner

VEHICLE CHASSIS SYSTEM WITH AN OFFSET TRACK BAR

TECHNICAL FIELD

Example embodiments generally relate to chassis system components and, more particularly, relate to a chassis system for an electrified vehicle.

BACKGROUND

Electric motors for an electrified vehicle add size to an axle of the vehicle. Due to the larger size of an electrified vehicle's axle compared to a standard mechanical axle, positions and designs of typical chassis system components may need adjustment. However, it is important to maintain lateral stiffness and lateral movement control of the axle despite the component adjustment. Accordingly, it may be desirable to modify chassis system components to accommodate a larger, electrified axle without altering the lateral stiffness and lateral movement of the axle.

BRIEF SUMMARY OF SOME EXAMPLES

In accordance with an example embodiment, a chassis system of a vehicle may be provided. The chassis system may include a frame of the vehicle forming a base for the vehicle, an axle operably coupled to the frame, the axle having a first portion with a first diameter and a second portion with a second diameter, an electric motor operably coupled to the axle to propel the vehicle, one or more wheel assemblies operably coupled to the axle, and a track bar operably coupled to the axle via a first end and operably coupled to the frame via a second end. The track bar may modulate lateral movement and lateral stiffness of the axle. The second end may be linearly displaced from the first end along a reference line, and the track bar may include a hook portion defining an offset from the reference line, the offset extending away from the axle. The hook portion may extend around a transition between the first portion and the second portion of the axle.

In another example embodiment, a track bar of a chassis system of a vehicle may be provided. The track bar may include a first end configured to operably couple to an axle, a second end configured to operably couple to a frame, and a hook portion defining an offset from a reference line, the offset extending away from the axle. The second end may be linearly displaced from the first end along the reference line. The axle may be configured to operably couple to the frame, and the axle having a first portion with a first diameter and a second portion with a second diameter. The track bar may be configured to modulate lateral movement and lateral stiffness of the axle. The hook portion may be configured to around a transition between the first portion and the second portion of the axle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
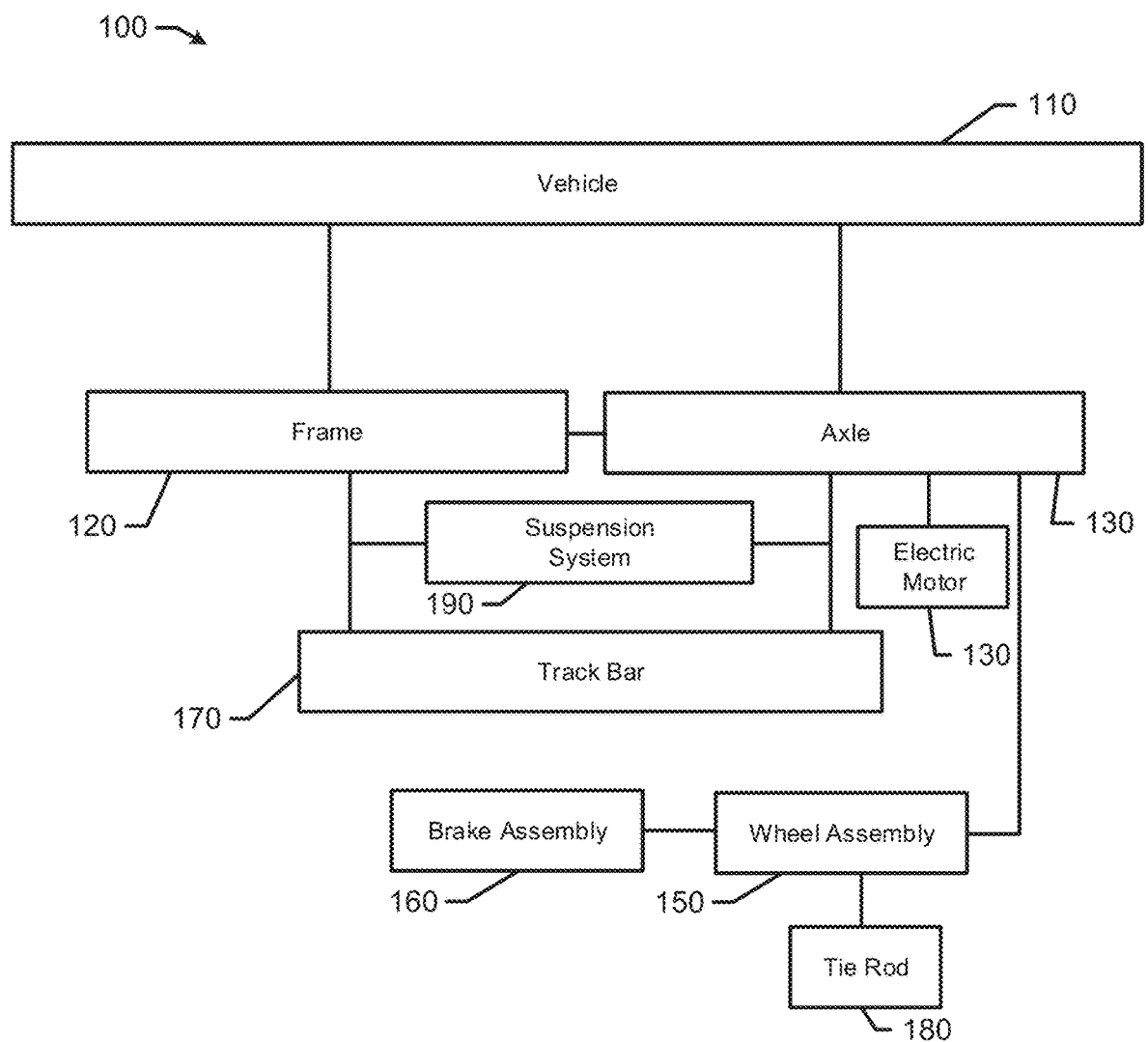
FIG. 1 depicts a block diagram of a chassis system for a vehicle in accordance with an example embodiment.
Figure 2:
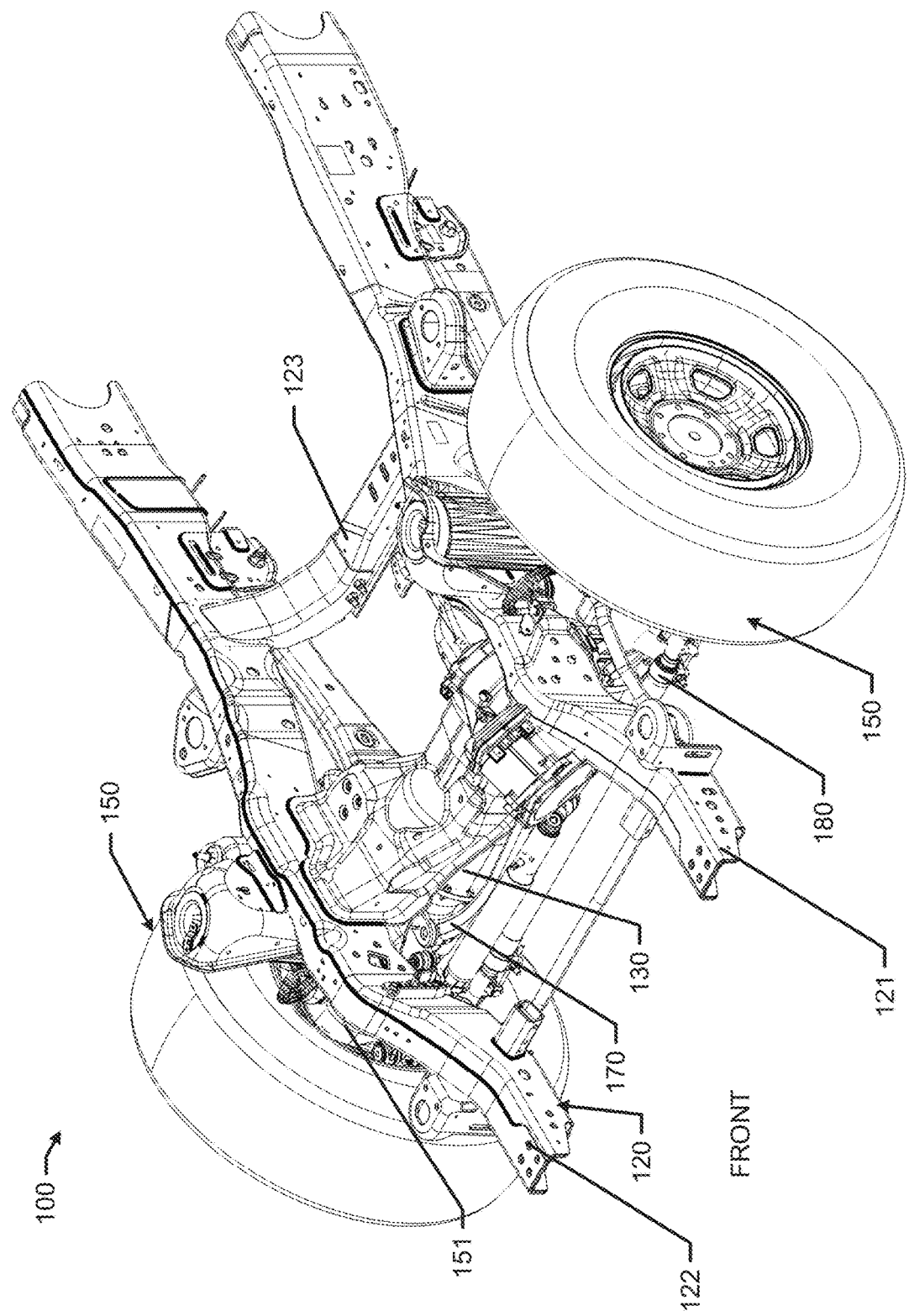
FIG. 2 illustrates an isometric view of a chassis system in accordance with an example embodiment.
Figure 3:
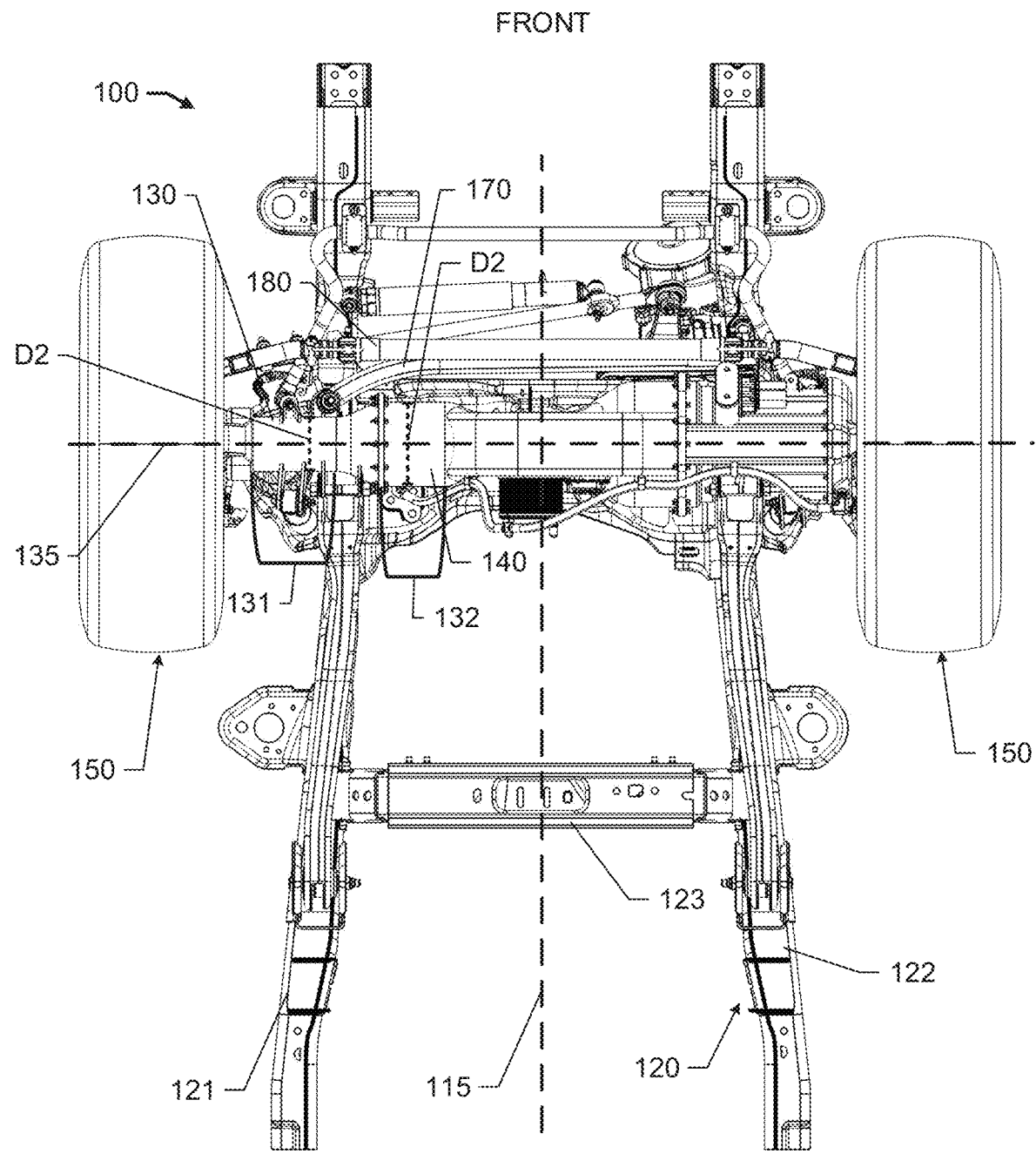
FIG. 3 depicts an underside view of a chassis system in accordance with an example embodiment.
Figure 4:
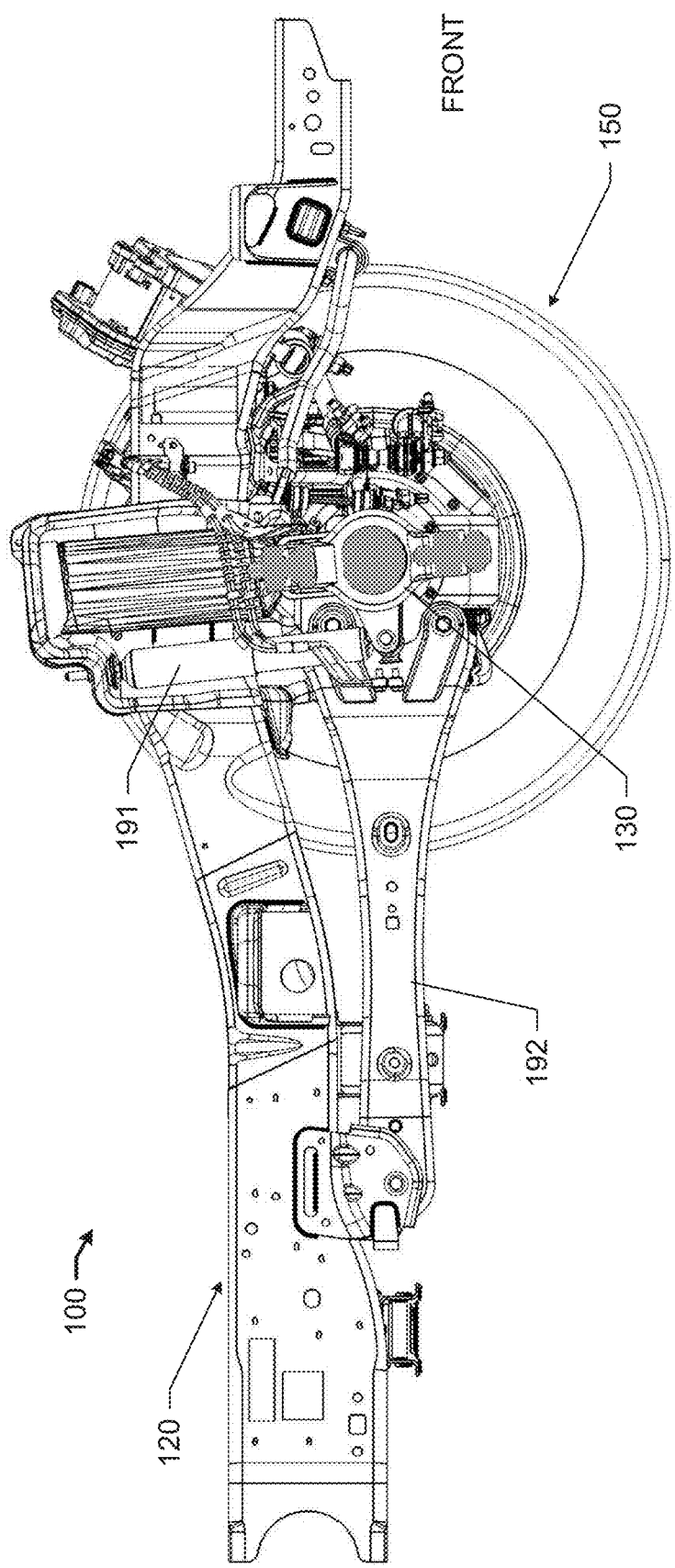
FIG. 4 illustrates a cross section view of a chassis system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the issues described above. In this regard, for example, some embodiments may provide a modified chassis system to maintain lateral stiffness and lateral movement of a larger axle within a vehicle. As a result, the addition of the new track bar design may help achieve the desired modified chassis system performance.

FIG. 1 illustrates a block diagram of a chassis system 100 for a vehicle 110 in accordance with an example embodiment. As seen in FIG. 1, some cases, the vehicle 110 may include a frame 120. In an example embodiment, the frame 120 may be a chassis or body of the vehicle 110. In some cases, the chassis or frame 120 may support and may form the foundation structure of the vehicle 110. In an example embodiment, the chassis and frame may be formed of one or more casted subframes, and a suspension system 190 may be operably coupled to the chassis or frame 120 to help operably couple a brake assembly 160 and/or a wheel assembly 150 to the chassis or frame 120. The vehicle 110 may include an axle 130.

In some cases, the vehicle 110 may be an electrified vehicle, and the axle 130 may be an e-axle. An electrified vehicle may be a fully electric vehicle or a hybrid vehicle. The hybrid vehicle may be a plug-in hybrid vehicle. The axle 130 may include an electric motor 140 that may be operably coupled the axle 130. In an example embodiment, the electric motor 140 may propel the vehicle 110 via driving the axle 130. A battery of the vehicle 110 may power the electric motor 140. The electric motor 140 may drive the axle 130 via a gearbox utilizing the power from the battery. The gearbox may be internal to the electric motor 140. In an example embodiment, the axle 130 may be a front axle and/or a rear axle of the vehicle 110. In some cases, only the rear axle may be the axle 130, and only the rear axle may include an electric motor 140.

In some embodiments, the axle 130 may be operably coupled to a wheel assembly 150 and a brake assembly 160.

In some cases, the wheel assembly 150 may include a tire and a wheel rim and may operably couple with the brake assembly 160 and the axle 130. The brake assembly 160 may include a brake rotor and other brake assembly components to help stop or slow the vehicle 110 and specifically the wheel assembly 150. In an example embodiment, the axle 130 may have a separate wheel assembly and separate brake assembly at each opposing end of the axle 130. The brake assembly 160 may be operably coupled to the axle 130 via the wheel assembly 150. The brake assembly 160 may be directly operably coupled to the axle 130. In some cases, the wheel assembly 150 may be operably coupled to the axle 130 via the brake assembly 160.

In some embodiments, the chassis system 100 may include a track bar 170. The track bar 170 may also be known as a panhard rod. The track bar 170 may be designed to limit lateral movement of the axle 130. The track bar 170 may be responsible for modulating or adjusting the lateral stiffness of the axle 130. In some cases, the track bar 170 may be operably coupled to the frame 120 and the axle 130 at respective opposing ends of the track bar 170. The track bar 170 may be operably coupled to the frame 120 and the axle 130 via a variety of methods. For example, the track bar 170 may include one or more insertable portions. The insertable portion may be inserted into an aperture of a bracket operably coupled to the frame 120 and the axle 130. The bracket may be a clevis bracket or an L-shaped bracket. In an example embodiment, the insertable portion may be threaded and secured to the bracket via a nut or other fastener. The operable coupling of the track bar 170 may not be limited to securement of an insertable portion with a bracket, but the track bar 170 may be operably coupled via any number of methods that results in a secure coupling with both the frame 120 and the axle 130.

In some cases, the chassis system 100 may include a tie rod 180 to help enable front steering of the vehicle 110. The tie rod 180 may be operably coupled to one or more wheel assemblies 150. The chassis system 100 may also include a suspension system 190. The suspension system 190 may be operably coupled to the frame 120 and the axle 130.

Figure 5:
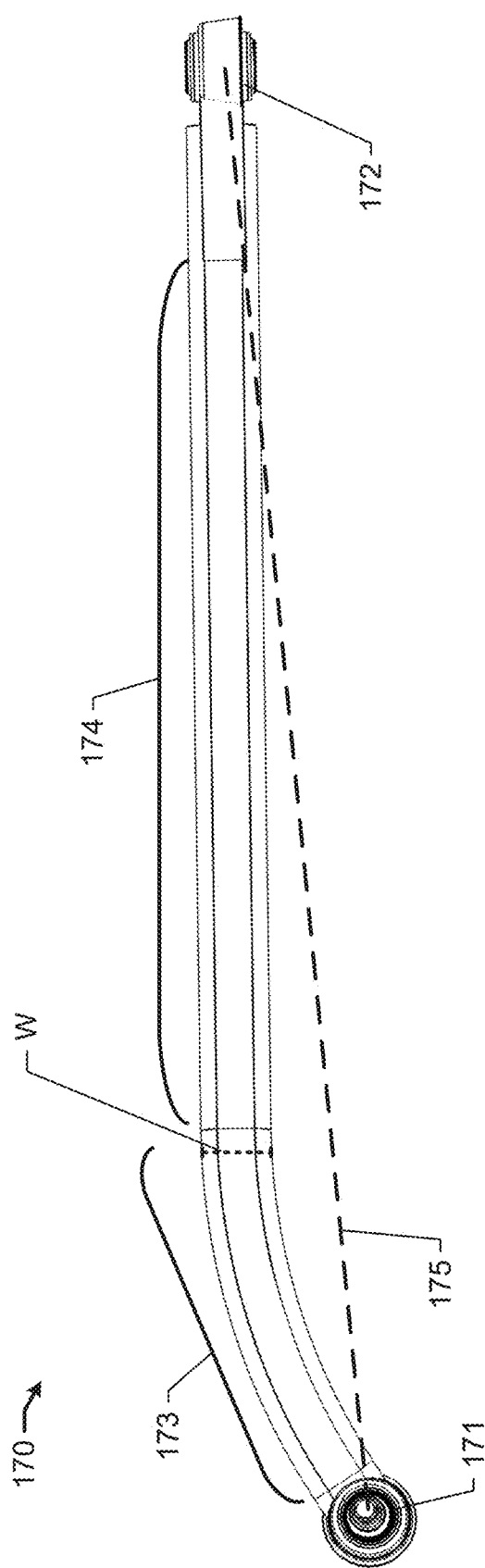
FIG. 5 depicts an underside view of a track bar of a chassis system in accordance with an example embodiment.
Figure 6:
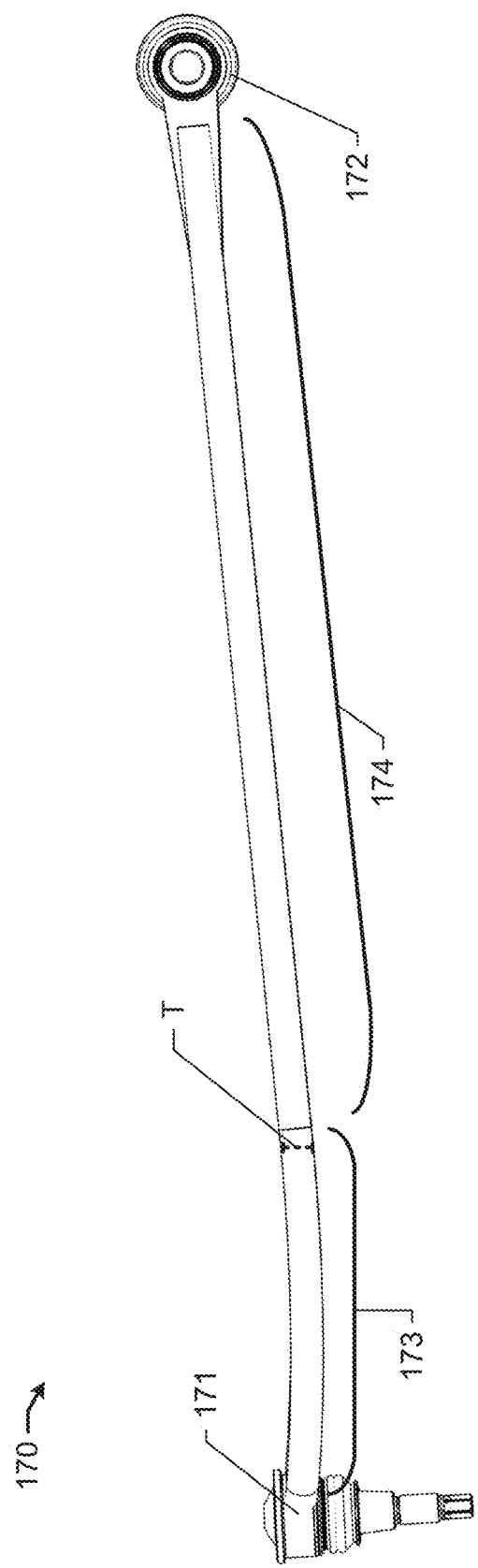
FIG. 6 illustrates an side view of a track bar of a chassis system in accordance with an example embodiment.

FIGS. 2-4, 7, and 8 illustrate various views and embodiments of a chassis system 100. FIGS. 5 and 6 depict various views and embodiments of a track bar of a chassis system. As can be seen in FIGS. 2-8, the chassis system 100 may include two wheel assemblies 150 operably coupled to the axle 130. A knuckle of the wheel assemblies 150 may operably couple to the wheel assemblies 150 to the axle 130.

In some cases, the axle 130 may include a first portion 131 and a second portion 132. The first portion 131 of the axle 130 may have a first diameter D1, and the second portion 132 may have a second diameter D2. The second diameter D2 may be larger than the first diameter D1. The axle may have a gradual transition or direct transition between the first portion 131 and the second portion 132. For example, in the case of the gradual transition, the axle 130 may slowly taper from the second diameter D2 to the first diameter D1 over a portion of the axle 130. In the case of the direct transition, the first portion 131 and the second portion 132 may be directly adjacent or proximate to one another.

In some cases, the electric motor 140 may be disposed at the second portion 132 of the axle 130. The electric motor 140 and a portion of the axle 130 may share the same housing. For example, the electric motor 140 and the axle 130 may be integrated in a unibody design. As such, the location of the electric motor at the second portion 132 of the axle 130 may result in the second diameter D2 being larger than the first diameter D1. In an example embodiment, the electric motor 140 may be separate from the axle 130, and the electric motor 140 and the axle 130 may only be operably coupled to one another and not integrally formed. The location of the electric motor 140 along the axle 130 may vary. For example, the electric motor 140 may be centered along the axle 130 or may be disposed closer to one end of the axle 130. In an example embodiment, the electric motor 140 may be disposed at a differential of the axle 130.

In some cases, responsive to the varying diameter of the axle 130, the structure of the track bar 170 may be modified to maintain its function, as well as to ensure easy integration within the chassis system 100 of the vehicle 110. The track bar 170 may include a first end 171 and the second end 172. In an example embodiment, the first end 171 may be operably coupled to the axle 130, and the second end 172 may be operably coupled to the frame 120. The second end 172 may be linearly displaced from the first end 171 along a reference line 175 that extends directly from the first end 171 to the second end 172. Meanwhile, the track bar 170 also includes a hook portion 173 that extends or bends away from the reference line 175. Moreover, when installed, the hook portion 173 may be positioned to extend in a direction away from the axle 130 to create clearance for the track bar 170 to extend around the transition between the first and second portions 131 and 132 of the axle 130.

As can be appreciated from the description above, the shape of the track bar 170 may vary along its length, and the track bar 170 may be defined by different portions. For example, the track bar 170 may include a hook portion 173 and straight portion 174. The hook portion 173 and the straight portion 174 may be adjacent or proximate to one another. In some cases, the hook portion 173 may be disposed proximate the first end 171, and the straight portion 174 may be disposed proximate the second end 172. A cross-section of the track bar 170 may be an oblong shape. An oblong shape may also be referred to as a disco-rectangle or a rounded rectangular shape. In an example embodiment, at least a section of the track bar 170 may have a cross-section with a circular shape.

The hook portion 173 may define an offset from the reference line 175. In some cases, as noted above, the hook portion 173 may be disposed at the transition between the first portion 131 and the second portion 132. The offset at the hook portion 173 may be aligned with or proximate the transition between the first portion 131 and the second portion 132 to provide clearance around the transition without sacrificing functionality of the track bar 170. In an example embodiment, the offset may be aligned with or proximate to the portion of the axle 130 with the largest diameter. For example, the offset may be aligned with or proximate to the position of the electric motor 140 on the axle 130. In some cases, the offset may be largest at the location of the electric motor 140. The offset may allow for easier integration of the track bar 170 to chassis system 100. The offset may also modify the lateral stiffness applied to the axle 130.

In an example embodiment, the thickness T of the track bar 170 may be smaller than the width W of the track bar 170. The thickness T to width W ratio of the track bar 170 may modify the lateral stiffness provided by the track bar 170. For example, with the thickness T being smaller than the width W, the lateral stiffness provided by the track bar 170 may be increased compared to a standard track bar. The thickness T may not be uniform throughout the entirety of the track bar 170. For example, the thickness T of the track bar 170 may be smallest at the hook portion 173. The width W may vary throughout the track bar 170, as well. The width W of the track bar 170 may be widest proximate the first end 171 and the second end 172.

In some cases, the straight portion 174 may be the majority of the track bar 170. The straight portion 174 may be substantially linear. Substantially linear may be not deviating from linear by more than about 5 degrees. Due to the linearity of the straight portion 174, the straight portion 174 may maintain a constant angle with a lateral axis 135 of the axle 130 (and the reference line 175). In some cases, the constant angle between the straight portion 174 and the lateral axis 135 of the axle 130 (or the reference line 175) may be between 10 degrees and 30 degrees.

In an example embodiment, the relative angle formed by the hook portion 173 and the offset defined by the hook portion 173 may vary depending on a type, model, or chassis system 100 of the vehicle 110. Varying the relative angle and offset defined by the hook portion 173 may adjust the lateral stiffness provided by the track bar 170, as well as allow for case of integration of the track bar 170 in a different type of chassis system 100. In some cases, the offset defined by the hook portion 173 in a chassis system 100 with the electric motor 140 operably coupled to the axle 130 may be 16 mm larger than an offset of a track bar 170 for a mechanical axle. The relative angle between the hook portion 173 and the reference line 175 may always be larger than the relative angle between the straight portion 174 and the reference line 175.

The track bar 170 may be disposed at a lower elevation than a center 136 of the axle 130. The elevation of each component may be determined based on the component's distance from a driving surface of the vehicle 110. For example, if the track bar 170 is disposed at a lower elevation than the center 136 of the axle 130, the track bar 170 may be closer to the driving surface than the center 136 of the axle 130. In some cases, the track bar 170 may be disposed closer to a front of the vehicle 110 than the axle 130.

Introduction of an electric motor 140 to the chassis system 100 may require modification of additional components of the chassis system 100 other than the track bar 170. For example, the tie rod 180 may need to be modified to integrate the electric motor 140 properly into the chassis system 100 while maintaining the desired functional standards of the chassis system 100.

In an example embodiment, the tie rod 180 may be disposed at the front of the vehicle 110. The tie rod 180 may assist in enabling steering and turning of the vehicle 110. The tie rod 180 may be operably coupled to the one or more wheel assemblies 150. The tie rod 180 may connect the two wheel assemblies 150 to one another. In some cases, the tie rod 180 may operably couple directly to a knuckle of the one or more wheel assemblies.

The axle 130 and the tie rod 180 may be disposed on opposite sides of the track bar 170. For example, the track bar 170 may be disposed between the axle 130 and the tie rod 180 along a longitudinal centerline 115 of the vehicle. In some cases, the tie rod 180 may be disposed closer to the front of the vehicle 110 than both the axle 130 and the track bar 170.

Figure 7:
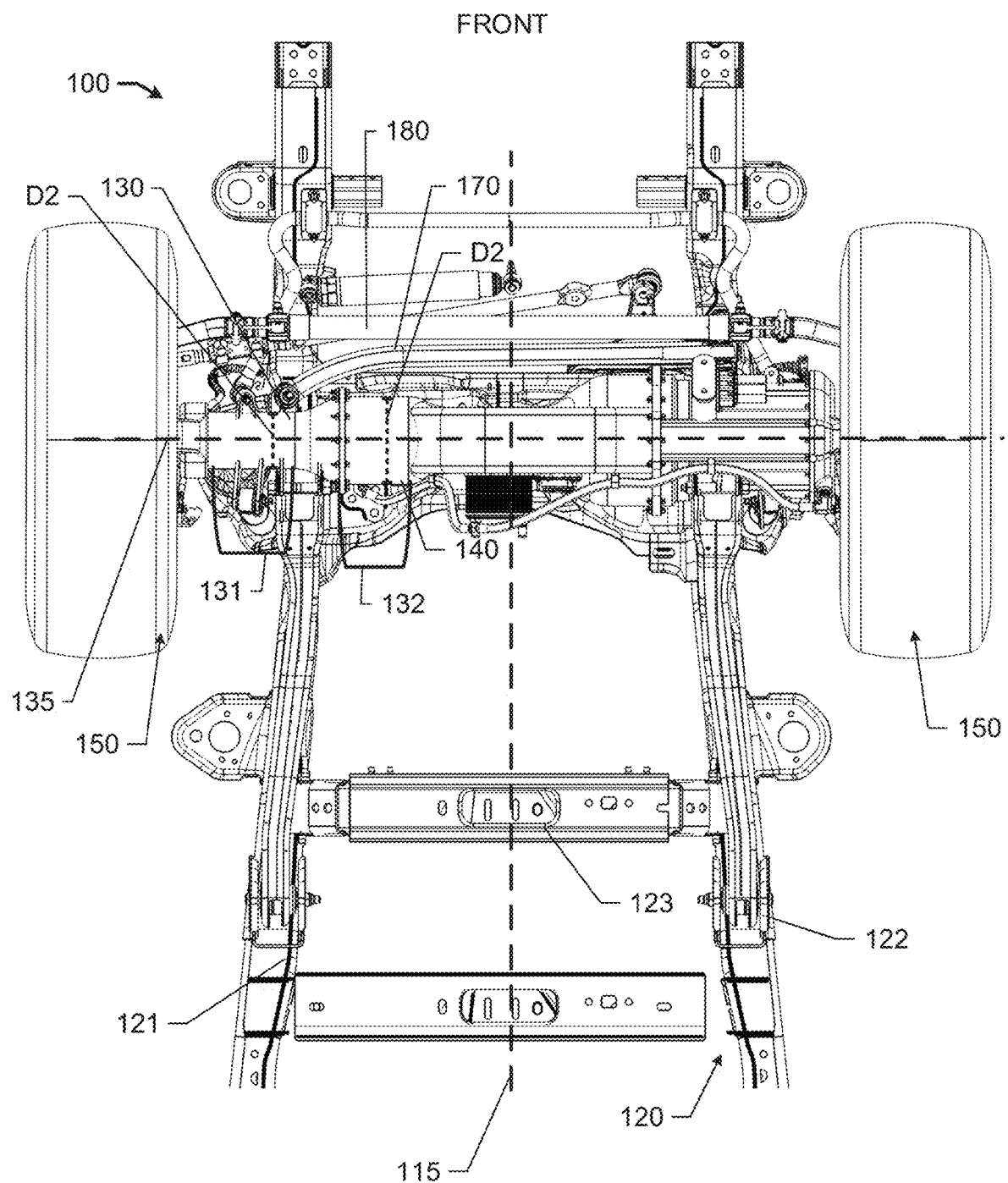
FIG. 7 depicts an underside view of a a chassis system in accordance with an example embodiment.
Figure 8:
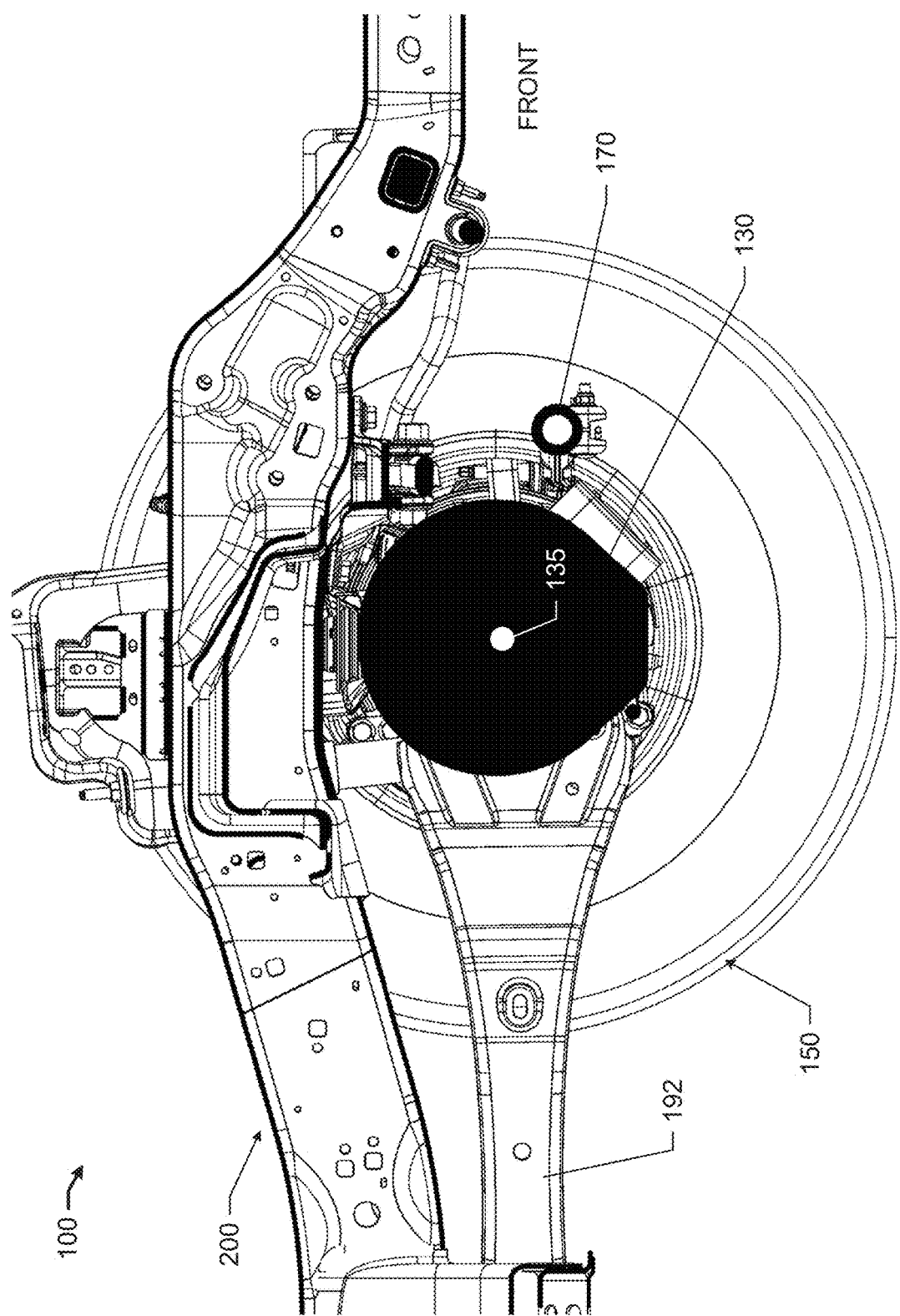
FIG. 8 illustrates a cross section view of a chassis system in accordance with an example embodiment.

Depending on the chassis system 100, the position of the tie rod 180 relative to the axle 130 may be modified via changing the size of the knuckle 151 of the one or more wheel assemblies 150. For example, by increasing the size of the knuckle 151, the tie rod 180 may be shifted forward towards the front of the vehicle 110 without changing the structure of the tie rod 180 (as seen in FIG. 7 compared to FIG. 3). The modification of the operably coupling location of the tie rod 180 and the knuckle 151 via the change in size of the knuckle 151 may increase the case of assembly of the chassis system 100 and of integration of components of the chassis system 100 without the need to modify additional components. Furthermore, by maintaining the structure of the tie rod 180, the specific functionality of the tie rod 180 may be easily maintained.

In some cases, the suspension system 190 may include a suspension damper 191. The suspension system 190 may be include multiple suspension dampers depending on the vehicle 110. The suspension damper 191 may function to absorb compression and rebound loading along a longitudinal axis of the suspension damper 191. In this regard, the suspension damper 191 may significantly limit oscillations and vibrations of the vehicle 110 by dampening the articulation motion of the one or more wheel assemblies 150 so that the articulation of the wheel assemblies 150 is not directly transferred to the frame 120 of the vehicle 110.

In an example embodiment, the suspension damper 191 may be a vertical damper that, in some other cases, may be referred to as a shock absorber. In an example embodiment, as the vehicle traverses uneven terrain and the wheel assembly 150 articulates towards the frame 120, the suspension damper 191 may compress due to a compression loading force. In some cases, the suspension damper 191 may be a monotube shock absorber, a twin-tube shock absorber, or a bladder shock absorber depending on the type of vehicle 110 or the desired damping control. In an example embodiment, the suspension damper 191 may be active, semi-active, or passive.

The suspension system 190 may include a radius arm 192. In some cases, the chassis system 100 may have a radius arm 192 for each of the one or more wheel assemblies 150. The radius arm 192 may help ensure the one or more wheel assemblies 150 maintain their desired angle.

In some cases, the suspension system 190 may need to be modified to enable the electric motor 140 of the vehicle 110. For example, the radius arm 192 of the suspension system 190 may need to be shifted aft or rearward of the axle 130. As a result of the change in the suspension system 190, the track bar 170 and the tie rod 180 may compensate for steering stiffness change. For example, depending on the chassis system 100 and the specific sizes of components, all three of the track bar 170, the tie rod 180, and the radius arm 192 may be adjusted to compensate for another and the integration of an electric motor. For example, if a radius arm 192 needs to shifted aft, the positon of the tie rod 180, as well as the design of the track bar 170, may be adjusted to maintain desired stiffness throughout the chassis system 100. In some cases, a stabilizer bar or other components of the chassis system 100 may be modified to ensure desired performance of the chassis system 100.

In an example embodiment, the frame 120 of the vehicle 110 may include two longitudinal support members extending along a longitudinal length of the vehicle 110. In some cases, the two longitudinal support members may include a left longitudinal support member 121, which may be disposed on a left side of the vehicle 110, and a right longitudinal support member 122, which may be disposed on a right side of the vehicle 110. The left longitudinal support member 121 and the right longitudinal support member 122 may be substantially parallel (+/−20 degrees) with one another, as well as parallel with the longitudinal centerline 115 of the vehicle 110. In an example embodiment, the axle 130 may be operably coupled to the vehicle 110 via the two longitudinal support members. In some cases, the axle 130 may be directly operably coupled to the two longitudinal support members, or the axle 130 may be operably coupled to the two longitudinal support members via a bracket or other coupling mechanism. In an example embodiment, the track bar 170 may be disposed between the left longitudinal support member 121 and the right longitudinal support member 122. The track bar 170 may be operably coupled to the frame 120 via one of the two longitudinal support members.

In an example embodiment, the frame 120 may further include a cross member 123. The cross member 123 may be substantially parallel (+/−20 degrees) with the axle 130. In some cases, the cross member 123 may be disposed closer to the rear of the vehicle 110 than the axle 130.

A chassis system of a vehicle may be therefore provided. The chassis system may include a frame of the vehicle forming a base for the vehicle, an axle operably coupled to the frame, the axle having a first portion with a first diameter and a second portion with a second diameter, an electric motor operably coupled to the axle to propel the vehicle, one or more wheel assemblies operably coupled to the axle, and a track bar operably coupled to the axle via a first end and operably coupled to the frame via a second end. The track bar may modulate lateral movement and lateral stiffness of the axle. The second end may be linearly displaced from the first end along a reference line, and the track bar may include a hook portion defining an offset from the reference line, the offset extending away from the axle. The hook portion may extend around a transition between the first portion and the second portion of the axle.

The chassis system of a vehicle of some embodiments may include additional features, modifications, augmentations and/or the like to achieve further objectives or enhance performance of the suspension system. The additional features, modifications, augmentations and/or the like may be added in any combination with each other. Below is a list of various additional features, modifications, and augmentations that can each be added individually or in any combination with each other. For example, a cross-section of the track bar may be an oblong shape. In some cases, the second diameter may be larger than the first diameter. In an example embodiment, the offset may be proximate to the first end. In some cases, a thickness of the track bar may be smaller than a width of the track bar. In an example embodiment, the thickness of the track bar may be variable along a length of the track bar, and the thickness of the track bar may be smallest at the hook portion of the track bar. In some cases, a straight portion of the track bar may be adjacent to the hook portion and may be closer to the second end compared to the first end, and the straight portion may maintain a constant angle relative to the reference line. In an example embodiment, the track bar may be disposed at a lower elevation than a center of the axle, and the track bar may be disposed closer to a front of the vehicle than the axle. In some cases, the axle and the electric motor may be integrated in a unibody design. In an example embodiment, the axle and a tie rod of the vehicle may be disposed on opposite sides of the track bar. In some cases, the tie rod may be operably coupled to one or more wheel assemblies, and a position of the tie rod relative to the axle and the track bar may be adjusted based on a size of a knuckle of the one or more wheel assemblies.

A track bar of a chassis system of a vehicle of an example embodiment may be provided. The track bar may include a first end configured to operably couple to an axle, a second end configured to operably couple to a frame, and a hook portion defining an offset from a reference line, the offset extending away from the axle. The second end may be linearly displaced from the first end along the reference line. The axle may be configured to operably couple to the frame, and the axle having a first portion with a first diameter and a second portion with a second diameter. The track bar may be configured to modulate lateral movement and lateral stiffness of the axle. The hook portion may be configured to around a transition between the first portion and the second portion of the axle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chassis system of a vehicle, the chassis system comprising:
 a frame of the vehicle forming a base for the vehicle;
 an axle operably coupled to the frame, the axle having a first portion with a first diameter and a second portion with a second diameter;
 an electric motor operably coupled to the axle to propel the vehicle;
 one or more wheel assemblies operably coupled to the axle; and
 a track bar operably coupled to the axle via a first end and operably coupled to the frame via a second end,
 wherein the track bar modulates lateral movement and lateral stiffness of the axle,
 wherein the second end is linearly displaced from the first end along a reference line,
 wherein the track bar includes a hook portion defining an offset from the reference line, the offset extending away from the axle, and
 wherein the hook portion extends around a transition between the first portion and the second portion of the axle.

2. The chassis system of claim 1, wherein a cross-section of the track bar is an oblong shape.

3. The chassis system of claim 1, wherein the second diameter is larger than the first diameter.

4. The chassis system of claim 1, wherein the offset is proximate to the first end.

5. The chassis system of claim 1, wherein a thickness of the track bar is smaller than a width of the track bar.

6. The chassis system of claim 5, wherein the thickness of the track bar is variable along a length of the track bar, and wherein the thickness of the track bar is smallest at the hook portion of the track bar.

7. The chassis system of claim 1, wherein a straight portion of the track bar is adjacent to the hook portion and is closer to the second end compared to the first end, and wherein the straight portion maintains a constant angle relative to the reference line.

8. The chassis system of claim 1, wherein the track bar is disposed at a lower elevation than a center of the axle, and wherein the track bar is disposed closer to a front of the vehicle than the axle.

9. The chassis system of claim 1, wherein the axle and the electric motor are integrated in a unibody design.

10. The chassis system of claim 1, wherein the axle and a tie rod of the vehicle are disposed on opposite sides of the track bar.

11. The chassis system of claim 10, wherein the tie rod is operably coupled to one or more wheel assemblies, and wherein a position of the tie rod relative to the axle and the track bar is adjusted based on a size of a knuckle of the one or more wheel assemblies.

12. A track bar of a chassis system of a vehicle, the track bar comprising:
a first end configured to operably couple to an axle;
a second end configured to operably couple to a frame; and
a hook portion defining an offset from a reference line, the offset extending away from the axle;
wherein the second end is linearly displaced from the first end in a direction away from the axle along the reference line,
wherein the axle is configured to operably couple to the frame, the axle having a first portion with a first diameter and a second portion with a second diameter,
wherein the track bar is configured to modulate lateral movement and lateral stiffness of the axle, and
wherein the hook portion is configured to extend around a transition between the first portion and the second portion of the axle.

13. The track bar of claim 12, wherein a cross-section of the track bar is an oblong shape.

14. The track bar of claim 12, wherein the second diameter is larger than the first diameter.

15. The track bar of claim 12, wherein a thickness of the track bar is smaller than a width of the track bar.

16. The track bar of claim 15, wherein the thickness of the track bar is variable along a length of the track bar, and wherein the thickness of the track bar is smallest at the hook portion of the track bar.

17. The track bar of claim 12, wherein a straight portion of the track bar is adjacent to the hook portion and is closer to the second end compared to the first end, and wherein the straight portion maintains a constant angle relative to the axle.

18. The track bar of claim 12, wherein the track bar is disposed at a lower elevation than a center of the axle, and wherein the track bar is disposed closer to a front of the vehicle than the axle.

19. The track bar of claim 12, wherein the axle and a tie rod of the vehicle are disposed on opposite sides of the track bar.

20. The track bar of claim 19, wherein the tie rod is operably coupled to one or more wheel assemblies, and wherein a position of the tie rod relative to the axle and the track bar is adjusted based on a size of a knuckle of the one or more wheel assemblies.

* * * * *